P. A. WESTERVELT.
Bee-Hive.
No. 206,509. Patented July 30, 1878.
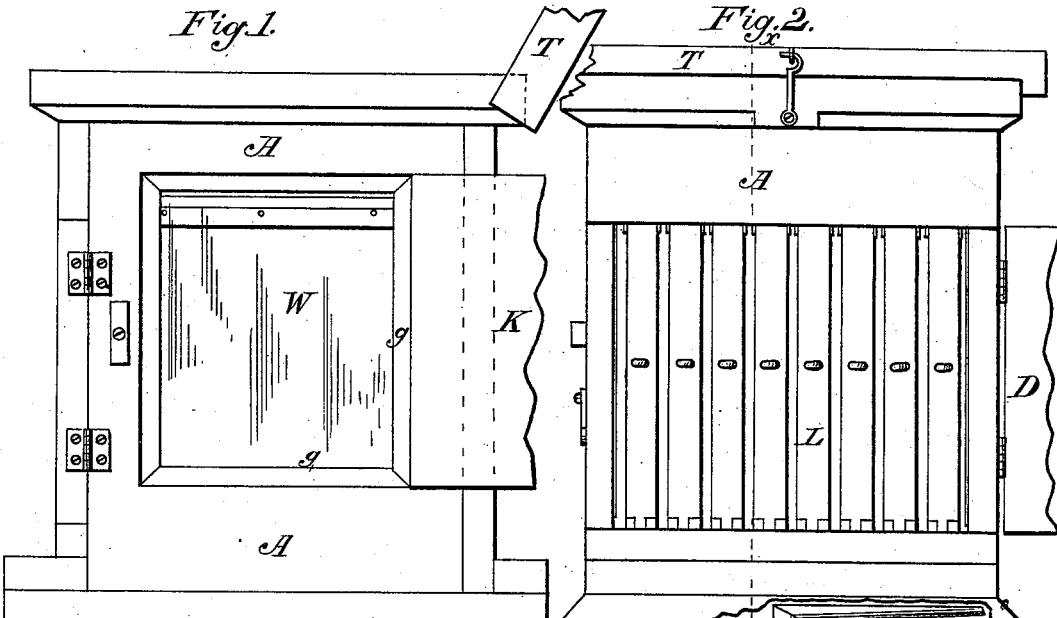
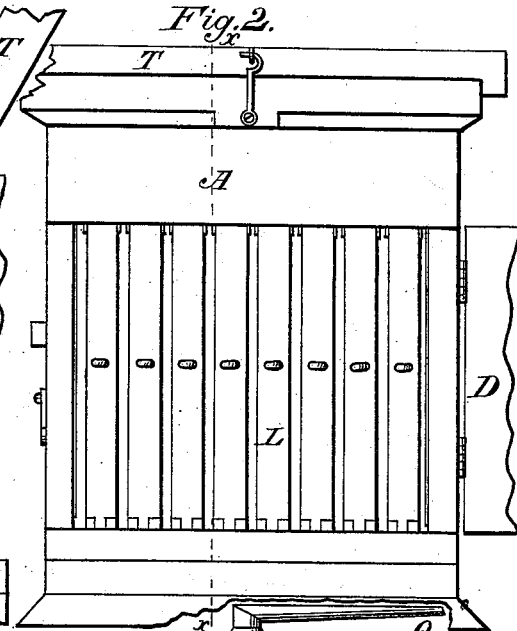
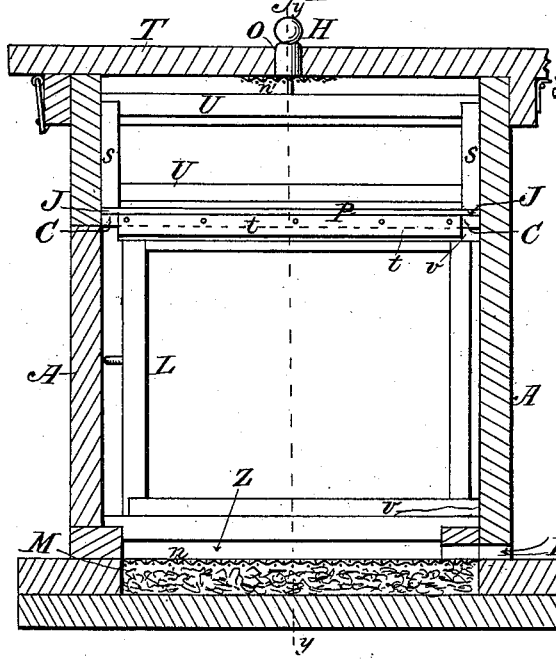
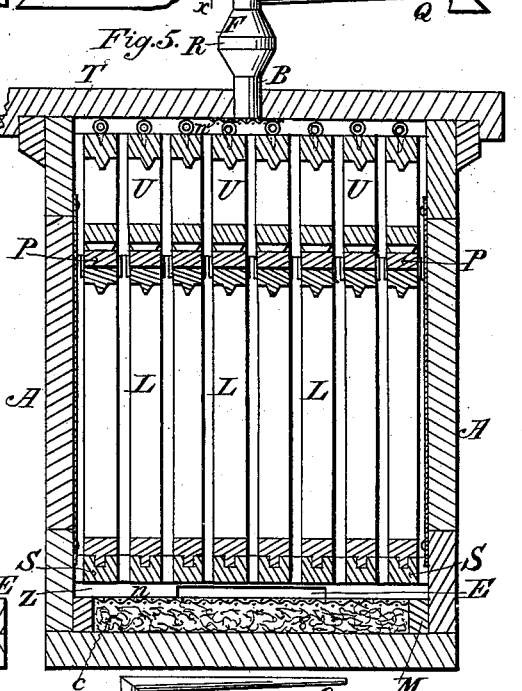
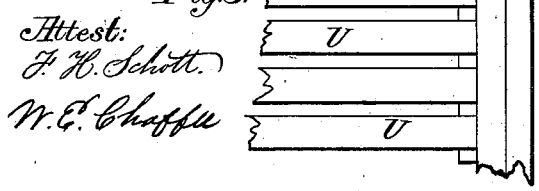
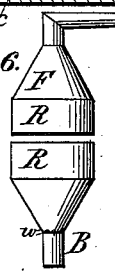
Attest:
F. H. Schott
W. E. Chaffee
Inventor
Peter A. Westervelt
by J. C. Tasker & Co.
attys
N. PETERS, PHOTO-LITHOGRAPHER, WASHINGTON, D.C.

UNITED STATES PATENT OFFICE.

PETER A. WESTERVELT, OF COLLEGE GROVE, TENNESSEE.

IMPROVEMENT IN BEE-HIVES.

Specification forming part of Letters Patent No. 206,509, dated July 30, 1878; application filed March 2, 1878.

*To all whom it may concern:*

Be it known that I, PETER A. WESTERVELT, of College Grove, county of Williamson, and State of Tennessee, have invented a new and useful Improvement in Bee-Hives, which improvement is fully set forth in the following specification and accompanying drawing.

Figure 1 is a side view of a hive with the lid or top raised and the side window-shutter thrown back. Fig. 2 is a front view of the hive with the front door thrown open, and the fumigator in position for throwing smoke into the upper part of the hive. Fig. 3 is a top view or plan, showing the hive with the top or lid thrown back. Fig. 4 is a section on the line X X of the plan, the top being down. Fig. 5 is a section on the line Y Y of the plan, showing, also, the entrance for the bees at the back of the hive. Fig. 6 is a view of the fumigator in two parts, showing how it may be opened.

The object of my invention is to provide a bee-hive that can be cheaply made, readily cleaned, that shall afford protection from the moth-miller and moth, to which access can at all times be easily had for inspection and removal of honey, to drive the bees at pleasure from the upper to the lower comb-frames of the hive, for the purpose of readily and safely taking honey from the frames in the upper part of the hive; and further, to provide a hive in which swarms of bees may be readily and easily placed, as will now be more specifically set out and shown.

In the accompanying drawing, A is the hive, which is a rectangular box with a hinged top, T, and a fixed bottom, divided into an upper and lower compartment by strips P, placed far enough apart for the bees to pass between. The upper compartment, which is the surplus honey-chamber, has within it the rectangular frames U, called the "upper frames," to hold the surplus honey. The projecting vertical sides of the frames U rest on the strips P, the projections J being long enough to prevent the bottom pieces of the frames from crushing or injuring the bees. The strips P are supported by or rest on ledges or cleats C, or may be attached to the inside of the case in any other manner. Each frame is held in position by and slides between vertical strips S attached to the inside of the front and back of the box or case, which allow a vertical sliding motion to each of the frames, by which they can be removed and the honey attached to them taken. In the lower compartment, which is the brood-chamber, is contained the larger rectangular vertical frames L, the tops of which slide between the tin slips *t*, which are attached to the sides of the strips P. The bottoms of the frames have tongues, which slide in grooves in strips S, so that these frames may be withdrawn horizontally from the compartment when the door D is opened. The top and bottom pieces of the frames L have projections V at the back, and thus prevent bees from being crushed or injured at the back of the box or case. Underneath the groove-strips S is the entrance-chamber Z, having the opening E for the entrance and egress of the bees. This entrance for the bees is placed at the back of the box or case, so that when the top T is raised for the purpose of removing the surplus honey it acts as a shield or protection from the bees entering or departing from the hive.

On a level with the opening E is a horizontal wire netting, *n*, attached to a movable frame, M. The space or chamber between the netting *n* and the bottom of the box or case is filled with chips, leaves, shavings, or sawdust of the cedar, hemlock, spruce, juniper, or any other wood to which the moth and moth-miller have an antipathy and will not pass over, or any other substance to which the moth and moth-miller have a dislike, and which is not offensive to bees. On the sides of the box or case are the glass windows W, with hinged shutters K. The glass windows W allow the inspection of the interior of the hive. These glass windows W are held in place by tin strips *g*, which are attached to the sides of the window-opening by tacks, screws, or small nails, which, when withdrawn, permit the glass to be removed and a swarm of bees introduced.

The top T and shutter K, when open and thrown back, operate so as to form a screen or protection from the bees to the person taking the surplus honey. The top T has in its center an opening, O, covered with wire netting *n'* on the inside. In this opening the bottom stem, B, of the fumigator F, made of tin or other sheet metal, is introduced when it is desired to drive the bees from the surplus-honey chamber to the brood-chamber. The fumigator F is so constructed as that it may be taken apart, as shown in Fig. 6. The large cavity R may be filled with cotton or cotton rags, or other material or substances, and the same set on fire. It may then be put together, as shown in Fig. 2, and the smoke may be forced into the upper part of the hive by blowing into the top stem, Q, thus forcing the bees into the brood-chamber. At the junction of the stem B with the cavity R is placed a wire netting, $w$, to prevent the burning substance from falling out. When the fumigator F is not being used, the opening O is stopped by the plug H, which effectually closes the same against moths, moth-millers, and rain.

This hive is so constructed that the moth and moth-miller cannot enter except at the opening or entrance E, and in attempting to do this they will scent the odor from the contents of the chamber and retire and not enter.

Having thus described my invention, what I claim as new, and desire to secure by Letters Patent, is—

The chamber $c$ within the frame M, filled with cedar or other wood shavings, to which the moth and moth-miller have an antipathy, covered with wire netting $n$, in combination with entrance-chamber Z, provided with opening E, substantially as and for the purpose specified.

PETER A. WESTERVELT.

Witnesses:
HORACE H. HARRISON,
HENRY I. MIFFLIN.